United States Patent
Miyake et al.

(10) Patent No.: US 9,989,141 B2
(45) Date of Patent: Jun. 5, 2018

(54) FASTENING STRUCTURE FOR FASTENING DRIVEN MEMBER TO STRAIN WAVE GEARING DEVICE UNIT, AND STRAIN WAVE GEARING DEVICE UNIT

(71) Applicant: Harmonic Drive Systems Inc., Shinagawa-ku, Tokyo (JP)

(72) Inventors: Sotaro Miyake, Azumino (JP); Yoshihide Kiyosawa, Azumino (JP)

(73) Assignee: HARMONIC DRIVE SYSTEMS INC., Shinagawa-ku, Tokyo (JP)

( * ) Notice: Subject to any disclaimer, the term of this patent is extended or adjusted under 35 U.S.C. 154(b) by 233 days.

(21) Appl. No.: 14/901,237

(22) PCT Filed: Jul. 4, 2013

(86) PCT No.: PCT/JP2013/004171
§ 371 (c)(1),
(2) Date: Dec. 28, 2015

(87) PCT Pub. No.: WO2015/001587
PCT Pub. Date: Jan. 8, 2015

(65) Prior Publication Data
US 2016/0201783 A1   Jul. 14, 2016

(51) Int. Cl.
*F16H 35/00* (2006.01)
*F16H 49/00* (2006.01)

(52) U.S. Cl.
CPC ..... *F16H 49/001* (2013.01); *F16H 2049/003* (2013.01)

(58) Field of Classification Search
CPC .................................................. F16H 49/001
(Continued)

(56) References Cited

U.S. PATENT DOCUMENTS 4,770,059 A * 9/1988 Beyer .................... B25J 9/1025
74/640
4,909,098 A * 3/1990 Kiryu ..................... F16C 33/40
384/532

(Continued)

FOREIGN PATENT DOCUMENTS

JP   62-255610 A   11/1987
JP    9-89053 A    3/1997
(Continued)

OTHER PUBLICATIONS

International Search Report (PCT/ISA/210) dated Sep. 10, 2013, by the Japanese Patent Office as the International Searching Authority for International Application No. PCT/JP2013/004171.

*Primary Examiner* — Ha Dinh Ho
(74) *Attorney, Agent, or Firm* — Buchanan Ingersoll & Rooney PC

(57) ABSTRACT

A press plate is tacked to a boss of a cup-shaped flexible externally toothed gear of a wave gear device unit. A second arm as a driven member is attached by a fastening bolt to an end surface on an outer side of an output flange of the wave gear device unit. The fastening bolt is screwed into and secured in a tap hole of the press plate from each bolt insertion hole of the second arm, via a flange-side bolt insertion hole and a boss-side bolt insertion hole. A fastening structure can be achieved in which a driven member is fastened to a wave gear device unit in which holes are easily machined into the output flange, and only a few fastening bolts are needed to fasten the boss, the output flange, and the driven member.

2 Claims, 2 Drawing Sheets

(58) Field of Classification Search
USPC .......................................................... 74/640
See application file for complete search history.

(56) References Cited

U.S. PATENT DOCUMENTS

| | | | |
|---|---|---|---|
| 5,775,178 A | 7/1998 | Asawa | |
| 6,182,532 B1* | 2/2001 | Shirasawa ............. | F16H 49/001 74/640 |
| 9,003,924 B2* | 4/2015 | Kanai .................... | F16H 49/001 74/412 R |

FOREIGN PATENT DOCUMENTS

| JP | 9-250607 A | 9/1997 |
|---|---|---|
| JP | 2002-339990 A | 11/2002 |
| JP | 2011-64265 A | 3/2011 |

* cited by examiner

FASTENING STRUCTURE FOR FASTENING DRIVEN MEMBER TO STRAIN WAVE GEARING DEVICE UNIT, AND STRAIN WAVE GEARING DEVICE UNIT

TECHNICAL FIELD

The present invention relates to: a fastening structure for fastening a driven member to a cup-shaped flexible externally toothed gear, which is a reduced-rotation-outputting element in a strain wave gearing device unit; and a strain wave gearing device unit using this fastening structure.

BACKGROUND ART

Known examples of strain wave gearing device units include units incorporating a cup-shaped flexible externally toothed gear as described in Patent Document 1. In such strain wave gearing device units, a rigid internally toothed gear is formed in an inner peripheral area of a cylindrical housing, and the cup-shaped flexible externally toothed gear is disposed inside the rigid internally toothed gear. An output flange is fixed in a coaxial manner to a boss defining the cup-bottom-surface portion of the flexible externally toothed gear.

To utilize a strain wave gearing device unit, a user attaches a motor shaft to an input-side wave generator, and attaches a driven member to the output-side end surface of the output flange. The high-speed rotation inputted to the wave generator from the motor shaft is delivered from the output flange as a reduced-rotation output. The driven member attached to the output flange is driven by the reduced rotation output.

PRIOR ART DOCUMENTS

Patent Documents

Patent Document 1: JP-A 2002-339990

SUMMARY OF INVENTION

Technical Problem

In a strain wave gearing device unit of this configuration, the output flange is coaxially fastened to the boss of the cup-shaped flexible externally toothed gear by fastening bolts. Bolt through-holes (drilled holes) are formed in the boss at prescribed angular intervals along the circumferential direction, and first tap holes (screw holes) are formed in the output flange at positions corresponding to the bolt through-holes. Fastening bolts are inserted from the boss side into the tap holes via the bolt through-holes, and the output flange is coaxially fastened to the boss.

Additionally, second tap holes are formed in the output flange at prescribed angular intervals along the circumferential direction so that the driven member can be fastened to the output flange from the user side. Bolt through-holes are formed in the driven member at positions corresponding to the second tap holes. Fastening bolts are inserted from the driven member side into the second tap holes through the bolt through-holes, whereby the driven member is fastened to the output flange.

It is thus necessary to form two types of tap holes in the output flange at prescribed angular intervals along the circumferential direction. Because it is necessary to form multiple tap holes, machining the holes is laborious, and many fastening bolts are required. Additionally, because it is necessary to maintain a space in which to align the multiple tap holes, it is disadvantageous to reduce the size of the output flange.

An object of the present invention is to provide: a fastening structure for fastening a driven member to a strain wave gearing device unit, the fastening structure being configured such that holes can easily be machined into an output flange, and only a few fastening bolts are necessary for fastening a boss of a flexible externally toothed gear, the output flange, and a driven member; and a strain wave gearing device unit in which this fastening structure is used.

Solution to Problems

To solve the problems described above, in a fastening structure for fastening a driven member to a strain wave gearing device unit, the strain wave gearing device unit has:

a boss formed in the cup-bottom-surface portion of a cup-shaped flexible externally toothed gear;

an output flange positioned and fixed at a first end surface of the boss;

a pressing member provisionally affixed to a second end surface of the boss, the second end surface being provided on the reverse side of the boss relative to the first end surface;

a plurality of boss-side bolt through-holes formed in the boss at prescribed angular intervals about a unit center axis;

a plurality of flange-side bolt through-holes formed in the output flange at positions that respectively correspond to the boss-side bolt through-holes; and a plurality of tap holes formed in the pressing member at positions that respectively correspond to the flange-side bolt through-holes.

Additionally, the driven member has a plurality of driven-member-side bolt through-holes formed at positions that respectively correspond to the flange-side bolt through-holes.

Furthermore, the driven member is attached to the end surface provided on the reverse side of the output flange relative to the boss, fastening bolts are inserted and fixed into the tap holes through the flange-side bolt through-holes and boss-side bolt through-holes from each of the driven-member-side bolt through-holes, and the driven member, the output flange, the boss, and the pressing member are fastened by the fastening bolts.

The fastening bolts used for fastening the driven member to the output flange are used to fasten the driven member, the output flange, the boss, and the pressing plate. Therefore, fewer fastening bolts are needed relative to the conventional fastening method, in which both fastening bolts for fastening the output flange to the boss and fastening bolts for fastening the driven member to the output flange are necessary.

Additionally, it is unnecessary to form tap holes in the output flange; bolt through-holes may be formed therein. Moreover, the number of bolt through-holes is less than in a case in which two types of tap holes are formed, as in the prior art. Accordingly, holes can easily be machined into the output flange, and the size and weight of the output flange can be reduced.

The pressing member is provisionally affixed to the boss. Therefore, in a case in which, e.g., bolts are used to provisionally affix the pressing member, only a few bolts for provisionally affixing are necessary, and these bolts are also small in size.

Therefore, according to the present invention, a fastening structure for a strain wave gearing device unit and a driven member can be realized using few components and in a small installation space. Accordingly, an advantage is presented in that the size and weight of the strain wave gearing device unit, as well as the size and weight of mechanisms where the strain wave gearing device unit is incorporated, can be reduced.

DESCRIPTION OF EMBODIMENTS

An embodiment of a fastening structure for fastening a driven member to a strain wave gearing device unit to which the present invention is applied is described below with reference to the drawings.

Figure 1:
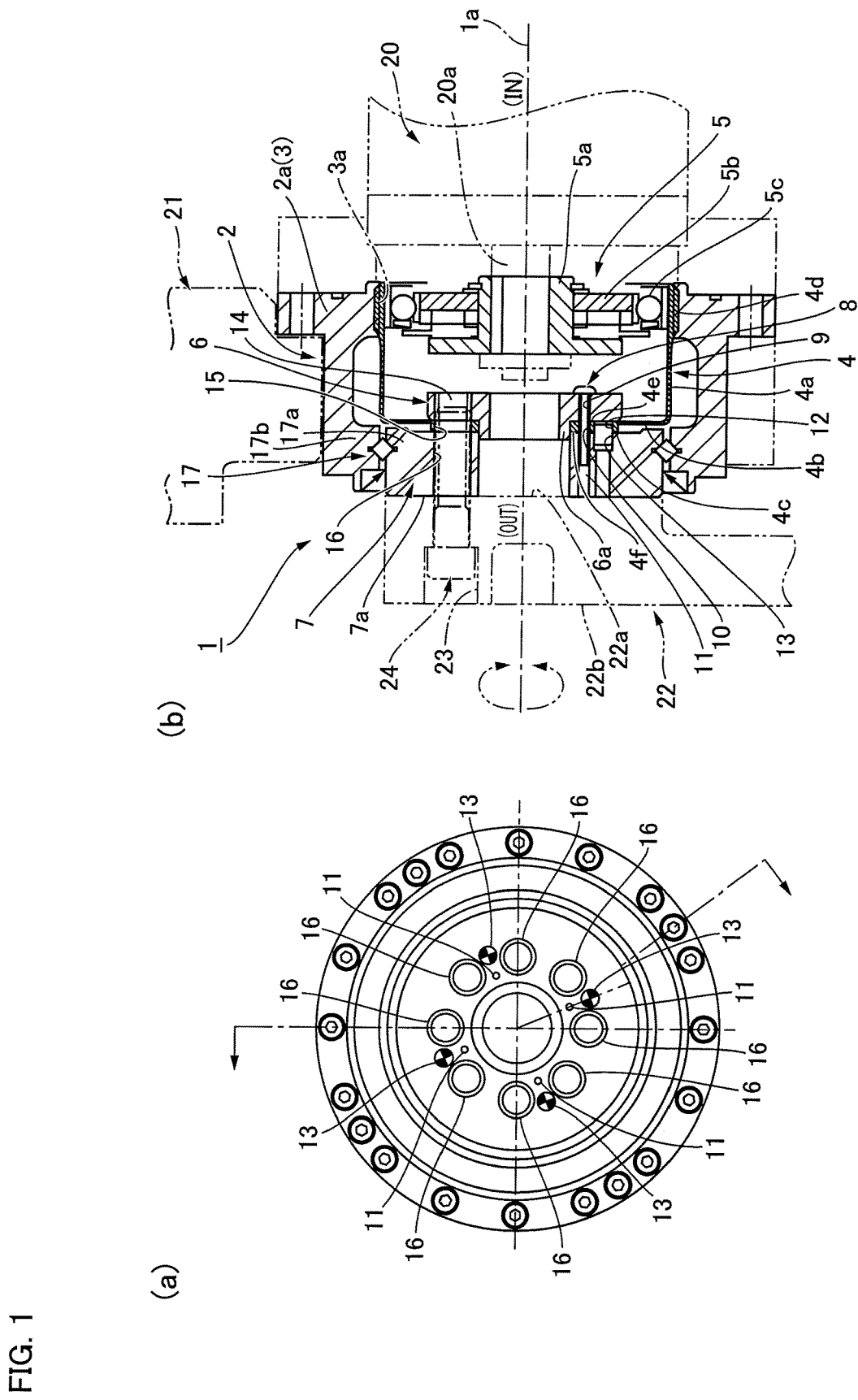
FIG. 1 is an output-side end view and a longitudinal cross-sectional view of a strain wave gearing device unit to which the present invention is applied.

FIGS. 1(a) and (b) are an output-side end view and a longitudinal cross-sectional view of a strain wave gearing device unit used for the fastening structure according to the present embodiment. The strain wave gearing device unit 1 comprises a cylindrical unit housing 2. An annular flange 2a of fixed width and large diameter is formed on the input-side IN end part of the unit housing 2, the input-side IN end part being located on one end of a unit center axis 1a. A rigid internally toothed gear 3 is integrally formed on the annular flange 2a, internal teeth 3a being formed on the circular inner peripheral surface of the rigid internally toothed gear 3. It is also possible to form the rigid internally toothed gear 3 as a member that is separate from the unit housing 2, and to fasten and fix the rigid internally toothed gear 3 to the unit housing 2.

A cup-shaped flexible externally toothed gear 4 is coaxially disposed inside the unit housing 2 with which the rigid internally toothed gear 3 is integrally formed. The flexible externally toothed gear 4 is disposed in a state in which an opening end therein faces toward the input side IN. The flexible externally toothed gear 4 comprises a cylindrical barrel part 4a capable of flexing in the radial direction, a diaphragm 4b that is continuous with the output-side OUT end of the cylindrical barrel part 4a and that extends radially inward, an annular boss 4c formed continuously with the inner peripheral edge of the diaphragm 4b, and external teeth 4d formed on the outer peripheral surface portion of the cylindrical barrel part 4a on the opening-end side. The cup-shaped bottom surface portion is defined by the diaphragm 4b and the boss 4c.

An ellipsoidally contoured wave generator 5 is inserted inside the portion of the cylindrical barrel part 4a at which the external teeth 4d are formed. The wave generator 5 comprises a hollow input shaft 5a, an ellipsoidally contoured rigid plug 5b attached to the outer peripheral surface thereof, and a wave bearing 5c fitted onto the outer peripheral surface of the rigid plug 5b. The wave bearing 5c is a ball bearing comprising an inner race and an outer race capable of flexing in the radial direction. The flexible externally toothed gear 4 is caused by the wave generator 5 to flex into an ellipsoidal shape, and the external teeth 4d positioned on the two end portions of the major axis of the ellipsoidal shape mesh with the internal teeth 3a of the rigid internally toothed gear 3.

An annular pressing plate 6 is coaxially attached to the input-side IN end surface 4e of the boss 4c of the flexible externally toothed gear. An annular part 6a protruding toward the output side OUT is formed on the inner peripheral edge portion of the pressing plate 6. The annular part 6a is inserted into the hollow part of the boss 4c. An annular output flange 7 is coaxially attached to the output-side OUT end surface 4f of the boss 4c. The pressing plate 6 is provisionally affixed to the boss 4c. A machine screw, a bolt, a pin, an adhesive, or the like can be used as means for provisionally affixing the pressing plate 6 to the boss 4c.

For example, the pressing plate 6 may be provisionally affixed to the boss 4c by a plurality of machine screws 8 for provisionally affixing. In the present example, four machine screw through-holes 9 are formed in the pressing plate 6 at 90° intervals. Four machine screw through-holes 10 are formed in the boss 4c, and four machine screw holes 11 are formed in the output flange 7. Machine screws 8 are screwed in from the pressing plate 6-side, whereby the pressing plate 6 is provisionally affixed to the boss 4c.

A plurality of pin holes 12 for positioning are formed in the boss 4c, and the same number of pin holes 13 are formed in the output flange 7. In the present example, four of each type of pin hole 12, 13 are formed at 90° intervals. Positioning pins are driven into corresponding pin holes 12, 13, and the boss 4c and output flange 7 are positioned and fixed in a coaxial state.

Additionally, a plurality of tap holes 14 are formed in the pressing plate 6 at prescribed angular intervals. In the present example, eight tap holes 14 are formed at equiangular intervals. Boss-side bolt through-holes 15 are respectively formed in the boss 4c at positions corresponding to the tap holes 14. Similarly, flange-side bolt through-holes 16 are respectively formed in the output flange 7 at positions corresponding to the boss-side bolt through-holes 15.

The output flange 7 is then supported in a rotatable state by the unit housing 2 with a cross roller bearing 17 interposed therebetween. The inner race 17a of the cross roller bearing 17 in the present example is integrally formed with the outer peripheral surface of the output flange 7. The outer race 17b of the cross roller bearing 17 is integrally formed with the output-side OUT end part of the unit housing 2. It is also possible to form the inner race 17a as a member that is separate from the output flange 7, and to fasten and fix the inner race 17a to the output flange 7. Similarly, it is also possible to form the outer race 17b as a member that is separate from the unit housing 2, and to fasten and fix the outer race 17b to the unit housing 2.

The strain wave gearing device unit 1 of this configuration is used by being incorporated into, e.g., an arm-driving mechanism of a horizontal articulated robot. In this case, a motor shaft 20a of a drive motor 20 is securely connected to the hollow input shaft 5a of the wave generator 5, as shown by the phantom lines in FIG. 1(b). The unit housing 2 is fixed to a fixed-side first arm 21 of the arm-driving mechanism. A driven member is fixed to the output flange 7. In the example shown in the drawings, a circular end surface 22a on the rear end part of a second arm 22, which is the driven member, overlaps the output-side OUT circular end surface 7a of the output flange, and the second arm 22 is fixed to the output flange 7 in this state.

When the wave generator 5 is caused by the drive motor 20 to rotate at high speed, the positions at which the flexible externally toothed gear 4 meshes with the rigid internally toothed gear 3 move along the circumferential direction. This produces relative rotation between the two gears 3, 4 in accordance with the difference in the number of teeth of the two gears 3, 4. The rigid internally toothed gear 3 is fixed to the first arm 21, and does not rotate. The flexible externally toothed gear 4 rotates, and a reduced-rotation output is delivered via the output flange 7 fixed to the boss 4c. The reduced-rotation output causes the second arm 22 to revolve about the unit center axis 1a.

Figure 2:
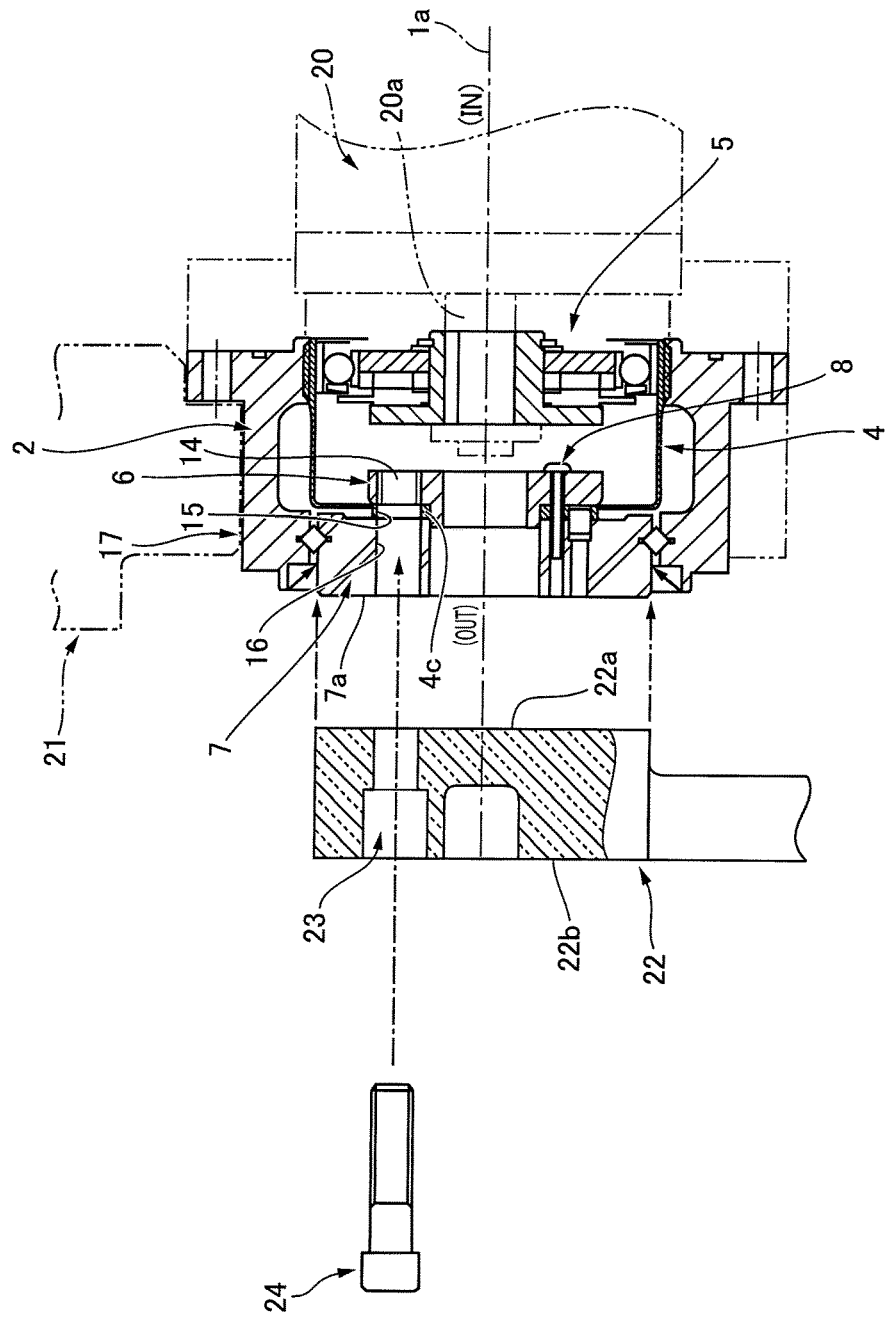
FIG. 2 is a schematic drawing showing a method for fastening a driven member to the strain wave gearing device unit of FIG. 1.

FIG. 2 is a schematic drawing showing a procedure for attaching the strain wave gearing device unit 1 to the second arm 22. The strain wave gearing device unit 1 is shipped to a user with the wave generator 5 removed from the strain wave gearing device unit 1. Additionally, the pressing plate 6 is provisionally affixed to the boss 4c.

Bolt insertion holes 23 are formed in the rear end part 22b of the second arm 22, which is the driven member, at fixed angular intervals about the center axis of revolution thereof. In the present example, eight bolt insertion holes 23 are formed corresponding with the flange-side bolt through-holes 16 in the output flange 7 of the strain wave gearing device unit 1.

The end surface 7a of the output flange 7 of the strain wave gearing device unit 1 is positioned so as to overlap the circular end surface 22a on the rear end part 22b of the second arm 22. In this state, fastening bolts 24 are inserted into the bolt insertion holes 23 from the second arm 22-side. The fastening bolts 24 are screwed into the tap holes 14 formed in the pressing plate 6 through the bolt insertion holes 23, flange-side bolt through-holes 16, and boss-side bolt through-holes 15. Eight fastening bolts 24 are screwed in and fixed, whereby the output flange 7 is fastened to the second arm 22, which is the driven member. Specifically, with the output flange 7 and the boss 4c clamped between the second arm 22 and the pressing plate 6, these four members are fastened together by the fastening bolts 24. Additionally, the provisionally affixed pressing plate 6 becomes permanently fastened to the boss 4c.

Before the second arm 22 is attached, operations are performed for attaching the unit housing 2 to the first arm 21, attaching the wave generator 5 to the motor shaft 20a, and fitting the wave generator 5 inside the flexible externally toothed gear.

The invention claimed is:

1. A fastening structure for fastening a driven member to a strain wave gearing device unit, wherein the strain wave gearing device unit comprises:

a boss formed in a cup-bottom-surface portion of a cup-shaped flexible externally toothed gear;

an output flange positioned and fixed at a first end surface of the boss;

a pressing member provisionally affixed to a second end surface of the boss, the second end surface being provided on a reverse side of the boss relative to the first end surface;

a plurality of boss-side bolt through-holes formed in the boss at prescribed angular intervals about a unit center axis;

a plurality of flange-side bolt through-holes formed in the output flange at positions that respectively correspond to each of the plurality of boss-side bolt through-holes; and a plurality of tap holes formed in the pressing member at positions that respectively correspond to each of the plurality of flange-side bolt through-holes, and wherein the driven member comprises a plurality of driven-member-side bolt through-holes formed at positions that respectively correspond to each of the plurality of flange-side bolt through-holes;

the driven member is attached to an end surface provided on a reverse side of the output flange relative to the boss;

fastening bolts are inserted and fixed respectively into each of the plurality of tap holes, respectively through each of the plurality of flange-side bolt through-holes, respectively through each of the plurality of boss-side bolt through-holes, and respectively from each of the driven-member-side bolt through-holes; and the driven member, the output flange, the boss, and the pressing member are fastened by the fastening bolts.

2. A strain wave gearing device unit for use in the fastening structure according to claim 1, the strain wave gearing device unit comprising:

the boss;

the output flange;

the pressing member;

the plurality of boss-side bolt through-holes;

the plurality of flange-side bolt through-holes; and the plurality of tap holes.

\* \* \* \* \*